US009254846B2

(12) United States Patent
Dolgov et al.

(10) Patent No.: US 9,254,846 B2
(45) Date of Patent: Feb. 9, 2016

(54) PREDICTIVE REASONING FOR CONTROLLING SPEED OF A VEHICLE

(71) Applicant: Google Inc., Mountain View, CA (US)

(72) Inventors: Dmitri Dolgov, Mountain View, CA (US); Dave Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 536 days.

(21) Appl. No.: 13/886,563

(22) Filed: May 3, 2013

(65) Prior Publication Data

US 2014/0330479 A1 Nov. 6, 2014

(51) Int. Cl.
*B60W 30/16* (2012.01)
*B60W 30/17* (2012.01)
*G01S 13/93* (2006.01)
*G08G 1/16* (2006.01)
*G08G 1/00* (2006.01)

(52) U.S. Cl.
CPC .............. *B60W 30/16* (2013.01); *B60W 30/17* (2013.01); *G01S 13/931* (2013.01); *G08G 1/167* (2013.01); *G08G 1/22* (2013.01); *B60W 2420/42* (2013.01); *B60W 2550/30* (2013.01); *B60W 2550/302* (2013.01); *B60W 2550/308* (2013.01); *B60W 2750/308* (2013.01); *G01S 2013/9325* (2013.01)

(58) Field of Classification Search
CPC ............ B60W 30/16; B60W 2420/42; B60W 2550/302; B60W 2550/308; B60W 30/17; B60W 2550/30; B60W 2750/308; G01S 2013/9325; G01S 13/931; G01S 2013/9353; G01S 2013/9364; G01S 2013/9367; G08G 1/22; G08G 1/167
See application file for complete search history.

(56) References Cited

U.S. PATENT DOCUMENTS 5,521,579 A * 5/1996 Bernhard ...................... 340/438
6,032,097 A * 2/2000 Iihoshi et al. .................. 701/96

(Continued)

FOREIGN PATENT DOCUMENTS

EP 2535883 A1 12/2012
WO 9907571 A1 2/1999

OTHER PUBLICATIONS

International Search Report and Written Opinion of International Application No. PCT/US2014/034903 dated Aug. 25, 2014 (mailed Aug. 25, 2014).

(Continued)

*Primary Examiner* — Y. Beaulieu
*Assistant Examiner* — Thomas Ingram
(74) *Attorney, Agent, or Firm* — McDonnell Boehnen Hulbert & Berghoff LLP

(57) ABSTRACT

Methods and systems for predictive reasoning for controlling speed of a vehicle are described. A computing device may be configured to identify a first and second vehicle travelling ahead of an autonomous vehicle and in a same lane as the autonomous vehicle. The computing device may also be configured to determine a first buffer distance behind the first vehicle at which the autonomous vehicle will substantially reach a speed of the first vehicle and a second buffer distance behind the second vehicle at which the first vehicle will substantially reach a speed of the second vehicle. The computing device may further be configured to determine a distance at which to adjust a speed of the autonomous vehicle based on the first and second buffer distances and the speed of the autonomous vehicle, and then provide instructions to adjust the speed of the autonomous vehicle based on the distance.

20 Claims, 7 Drawing Sheets

(56) References Cited

U.S. PATENT DOCUMENTS

| | | | |
|---|---|---|---|
| 6,292,725 | B1 | 9/2001 | Kageyama |
| 6,487,500 | B2 | 11/2002 | Lemelson |
| 7,085,637 | B2 | 8/2006 | Breed |
| 8,311,720 | B2* | 11/2012 | Pelosse ............... 701/96 |
| 8,395,529 | B2 | 3/2013 | Seder |
| 2006/0095192 | A1* | 5/2006 | Uhler et al. ............ 701/96 |
| 2007/0185639 | A1* | 8/2007 | Osborn et al. .......... 701/71 |
| 2009/0299598 | A1* | 12/2009 | Boecker et al. ......... 701/96 |
| 2010/0152963 | A1* | 6/2010 | Heckel et al. .......... 701/34 |
| 2010/0256835 | A1* | 10/2010 | Mudalige .............. 701/2 |
| 2010/0256852 | A1* | 10/2010 | Mudalige .............. 701/24 |
| 2011/0093177 | A1* | 4/2011 | Horn .................. 701/70 |
| 2011/0270514 | A1* | 11/2011 | Shida ................. 701/117 |
| 2012/0029783 | A1* | 2/2012 | Takenaka et al. ....... 701/73 |
| 2012/0078484 | A1* | 3/2012 | Kato .................. 701/96 |
| 2012/0083960 | A1* | 4/2012 | Zhu et al. ............ 701/23 |
| 2013/0226431 | A1* | 8/2013 | Lu et al. ............. 701/96 |
| 2013/0345944 | A1* | 12/2013 | Kasiraj et al. ........ 701/96 |
| 2014/0005907 | A1* | 1/2014 | Bajpai ................ 701/96 |
| 2014/0114548 | A1* | 4/2014 | Kagerer et al. ........ 701/96 |
| 2014/0176350 | A1* | 6/2014 | Niehsen et al. ........ 340/988 |
| 2014/0297172 | A1* | 10/2014 | Huelsen ............... 701/301 |

OTHER PUBLICATIONS

F01/F02 Cruise Control Systems, Initial Print Date Jan. 2009.
"Adaptive Cruise Control and Driver Modeling", Johan Bengtsson, Department of Automatic Control Lund Institute of Technology, Lund, Nov. 2001.

* cited by examiner

COMPUTER PROGRAM PRODUCT 600

SIGNAL BEARING MEDIUM 601

PROGRAM INSTRUCTIONS 602

- IDENTIFYING A FIRST OBJECT AHEAD OF AN AUTONOMOUS VEHICLE

- IDENTIFYING A SECOND OBJECT AHEAD OF THE FIRST OBJECT, WHEREIN THE FIRST AND SECOND OBJECTS ARE IN SUBSTANTIALLY A SAME LANE AS THE AUTONOMOUS VEHICLE

- DETERMINING A FIRST BUFFER DISTANCE, THE FIRST BUFFER DISTANCE BEING A MINIMAL DISTANCE BEHIND THE FIRST OBJECT AT WHICH THE AUTONOMOUS VEHICLE WILL SUBSTANTIALLY REACH A SPEED OF THE FIRST OBJECT

- DETERMINING A SECOND BUFFER DISTANCE, THE SECOND BUFFER DISTANCE BEING A MINIMAL DISTANCE BEHIND THE SECOND OBJECT AT WHICH THE FIRST OBJECT WILL SUBSTANTIALLY REACH A SPEED OF THE SECOND OBJECT

- DETERMINING A DISTANCE AT WHICH TO ADJUST A SPEED OF THE AUTONOMOUS VEHICLE BASED ON THE FIRST AND SECOND BUFFER DISTANCES AND THE SPEED OF THE AUTONOMOUS VEHICLE

- PROVIDING INSTRUCTIONS TO ADJUST THE SPEED OF THE AUTONOMOUS VEHICLE BASED ON THE DISTANCE

| COMPUTER READABLE MEDIUM 603 | COMPUTER RECORDABLE MEDIUM 604 | COMMUNICATIONS MEDIUM 605 |

FIGURE 6

PREDICTIVE REASONING FOR CONTROLLING SPEED OF A VEHICLE

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to predictive reasoning for controlling speed of a vehicle. In one aspect, the present application describes a method. The method may comprise identifying a first vehicle travelling ahead of an autonomous vehicle. The method may also comprise identifying a second vehicle ahead of the first vehicle, the first and second vehicles travelling in substantially a same lane as the autonomous vehicle. The method may also comprise determining a first buffer distance, the first buffer distance being a minimal distance behind the first vehicle at which the autonomous vehicle will substantially reach a speed of the first vehicle. The method may also comprise determining a second buffer distance, the second buffer distance being a minimal distance behind the second vehicle at which the first vehicle will substantially reach a speed of the second vehicle. The method may also comprise determining a distance at which to adjust a speed of the autonomous vehicle based on the first and second buffer distances and the speed of the autonomous vehicle. The method may further comprise providing instructions by a computing device to adjust the speed of the autonomous vehicle based on the distance.

In another aspect, the present application describes a non-transitory computer readable medium having stored thereon executable instructions that, upon execution by a computing device, cause the computing device to perform functions. The functions may comprise identifying a first vehicle travelling ahead of an autonomous vehicle. The functions may also comprise identifying a second vehicle ahead of the first vehicle, the first and second vehicles travelling in substantially a same lane as the autonomous vehicle. The functions may also comprise determining a first buffer distance, the first buffer distance being a minimal distance behind the first vehicle at which the autonomous vehicle will substantially reach a speed of the first vehicle. The functions may also comprise determining a second buffer distance, the second buffer distance being a minimal distance behind the second vehicle at which the first vehicle will substantially reach a speed of the second vehicle. The functions may also comprise determining a distance at which to adjust a speed of the autonomous vehicle based on the first and second buffer distances and the speed of the autonomous vehicle. The functions may further comprise providing instructions to adjust the speed of the autonomous vehicle based on the distance.

In still another aspect, the present application describes a system. The system may comprise at least one processor. The system also may comprise a memory having stored thereon instructions that, upon execution by the at least one processor, cause the system to perform functions. The functions may comprise identifying a first object ahead of an autonomous vehicle. The functions may also comprise identifying a second object ahead of the first object, where the first and second objects are in substantially a same lane as the autonomous vehicle. The functions may also comprise determining a first buffer distance, the first buffer distance being a minimal distance behind the first object at which the autonomous vehicle will substantially reach a speed of the first object. The functions may also comprise determining a second buffer distance, the second buffer distance being a minimal distance behind the second object at which the first object will substantially reach a speed of the second object. The functions may also comprise determining a distance at which to adjust a speed of the autonomous vehicle based on the first and second buffer distances and the speed of the autonomous vehicle. The functions may further comprise providing instructions to adjust the speed of the autonomous vehicle based on the distance.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of a computer program.

DETAILED DESCRIPTION

Figure 1:
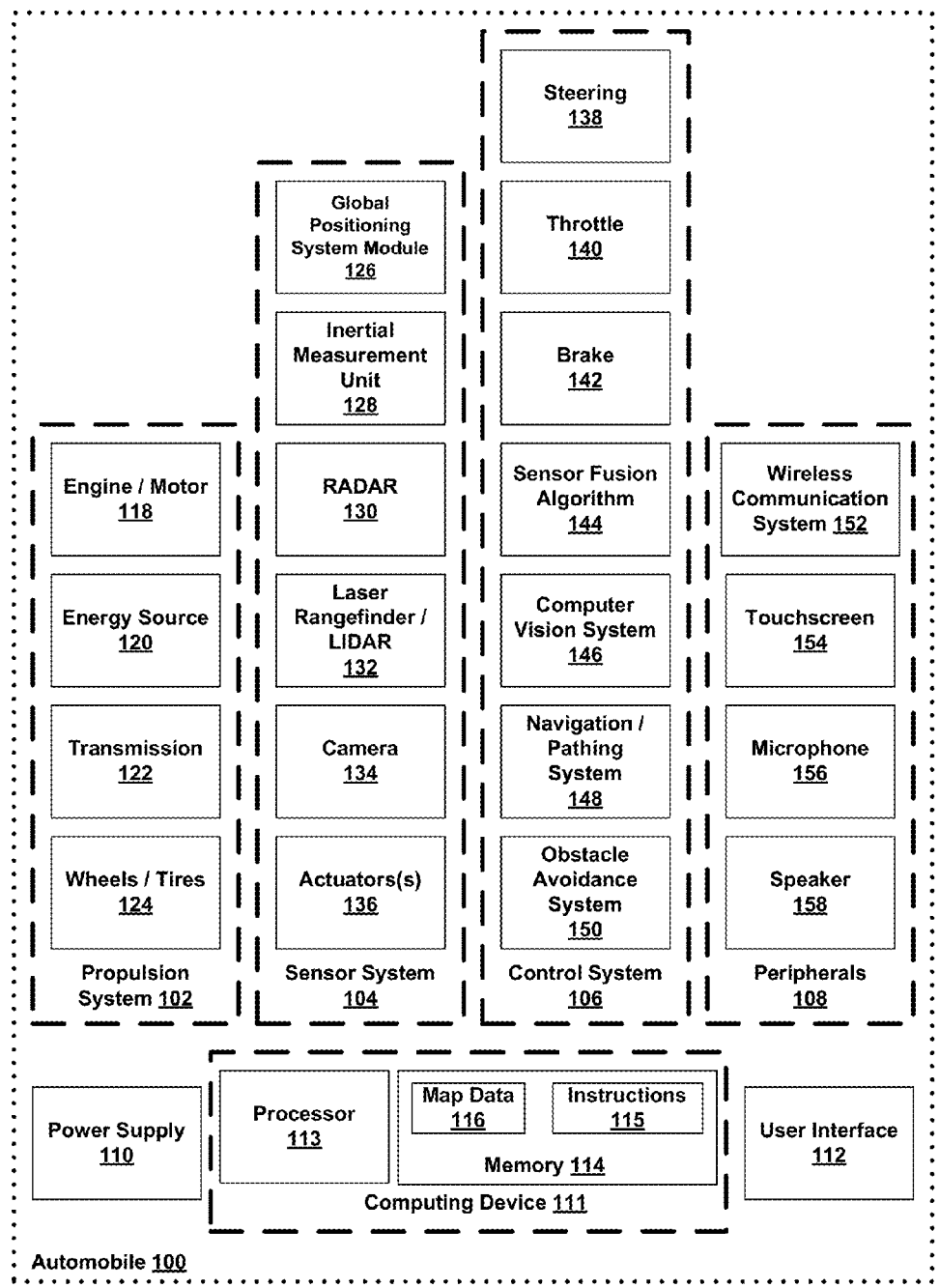
FIG. 1 is a simplified block diagram of an example automobile.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road or path of travel may be configured to identify objects within an environment of the autonomous vehicle in order to determine an adjustment to the autonomous vehicle's current speed. The objects can be other vehicles, traffic control objects, or other types of objects. In some examples, each identified object may be considered independently, and the respective characteristics of the object, such as its current speed, acceleration, and range to the vehicle, may be used to determine a speed for the autonomous vehicle to adjust to.

However, in other examples, the autonomous vehicle, or computing device associated with the autonomous vehicle, may be configured to predict behaviors of the identified objects based on the characteristics of the objects and a state of the surrounding environment (e.g., traffic, rain, ice on the road, etc.), and the objects may all be considered together—each dependent on each other's behavior. The autonomous vehicle can then adjust its speed based on the predicted behaviors of the objects. In other words, the autonomous vehicle can determine what steady state the vehicle will need to adjust to (e.g., speed up, slow down, or stop) based on the predicted behaviors of the objects. Other characteristics/factors may be considered as well in order to determine the speed of the autonomous vehicle, such as a lateral position of the autonomous vehicle in a road/lane of travel, curvature of the road, proximity of static and dynamic objects, etc.

In one example of predictive speed control, a computing device, configured to adjust the speed of an autonomous vehicle, may identify multiple objects ahead of the vehicle. The objects may include, for example, other vehicles travelling ahead of the autonomous vehicle in the same lane as the autonomous vehicle, such as trucks, bicycles, and motorcycles. The objects may also include other types of static or dynamic objects, such as pedestrians, stop signs, a toll booth, trees, guard rails, etc. Upon identifying the objects, the computing device may be configured to estimate characteristics of each object, such as the object's speed, acceleration, size, weight, direction of travel, and longitudinal and lateral speeds.

After identifying the objects, the computing device may determine a buffer distance for each object between the autonomous vehicle and the farthest identified object from the autonomous vehicle. For example, if the computing device identifies a first and second object ahead of the vehicle, the second object being at a greater distance from the autonomous vehicle than the first object, the computing device may determine a first buffer distance at which the autonomous vehicle will substantially reach a speed of the first object, and also determine a second buffer distance at which the first object will substantially reach a speed of the second object. The buffer distances may be based on the speeds of the identified objects. In some examples, the buffer distances may also be based on other characteristics of the identified objects.

Based on the buffer distances and the speed of the autonomous vehicle, the computing device may then determine a distance at which to adjust the speed of the autonomous vehicle. The distance may also be a function of other characteristics of the objects and the autonomous vehicle, as well as any predetermined (e.g., calibrated) constants. The computing device may be configured to then provide instructions to adjust the speed of the autonomous vehicle based on the distance.

In some embodiments, the instructions may be provided prior to the computing device detecting a change of the speed of at least one of the objects ahead of the autonomous vehicle. As such, the autonomous vehicle may adjust its speed based on an estimation of the change of the speed of at least one of the objects prior to such change occurring. Such a change in the speed of the object(s) may be evaluated differently in various embodiments. For example, the change in the speed may be indicated by the speed of the object(s) exceeding a given threshold. Other examples are also possible.

In addition to providing instructions to adjust the speed of the autonomous vehicle, the computing device may be configured to provide instructions to modify a steering angle of the autonomous vehicle so as to cause the autonomous vehicle to follow a given trajectory and/or maintain safe lateral and longitudinal distances with the objects in the vicinity of the autonomous vehicle (e.g., cars in adjacent lanes on a road). The computing device may also be configured to implement heuristics to mimic human-like behavior to determine the distance and adjust the speed of the autonomous vehicle accordingly (and possibly control the autonomous vehicle in other manners, such as adjusting the autonomous vehicle's steering/trajectory).

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
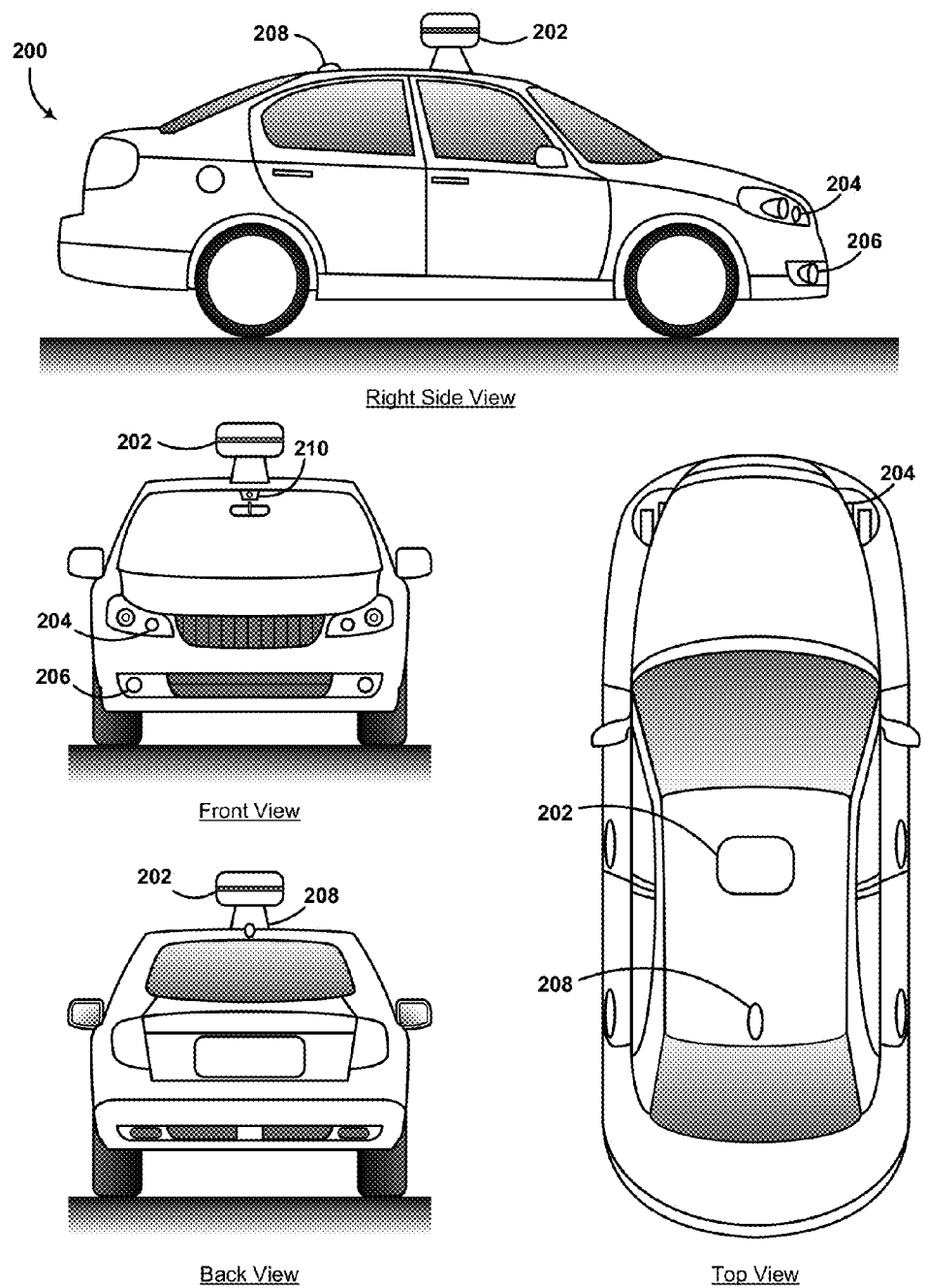
FIG. 2 illustrates an example automobile.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
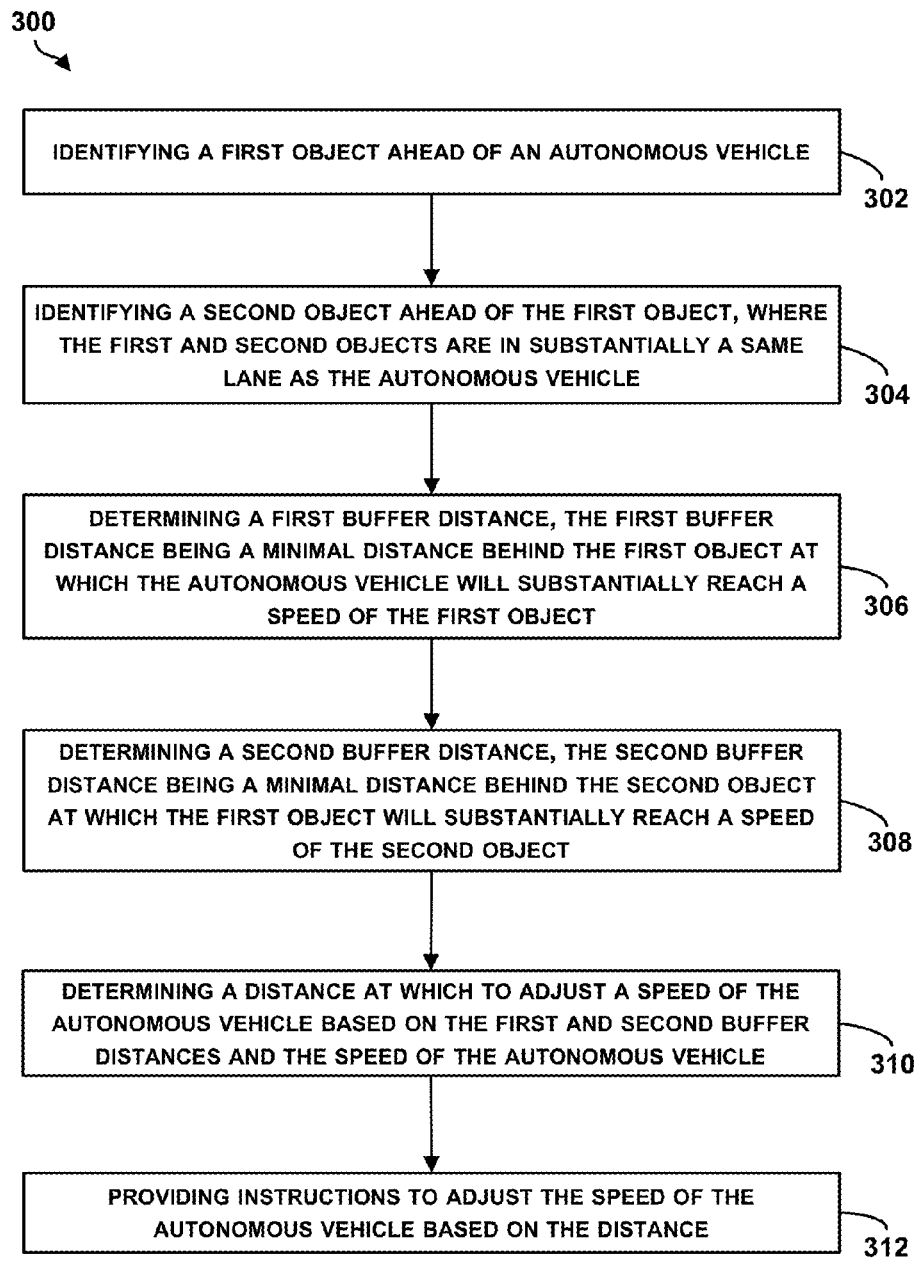
FIG. 3 is a flow chart of an example method for adjusting a speed of an autonomous vehicle.

FIG. 3 is a flow chart of an example method 300 for adjusting a speed of a vehicle. The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process. For the sake of example, the method 300 shown in FIG. 3 will be described as implemented by an example computing device, such as the computing device 111 in FIG. 1. The method 300 can also be described as implemented by an autonomous vehicle, as the computing device may be onboard the vehicle or may be off-board but in wireless communication with the vehicle. Therefore the terms "computing device" and "autonomous vehicle" can be interchangeable herein. However, in some examples, the computing device may be configured to control the vehicle in an autonomous or semi-autonomous operation mode. It should be understood that other entities or combinations of entities can implement one or more steps of the example method 300.

At block 302, the method 300 includes identifying a first object ahead of an autonomous vehicle. Further, at block 304, the method includes identifying a second object ahead of the first object, where the first and second objects are in substantially in a same lane as the autonomous vehicle. It should be understood, however, that additionally or alternatively to identifying objects ahead of (or substantially in front of) the autonomous vehicle and in substantially the same lane as the autonomous vehicle, the computing device can be configured to identify other objects within an environment of the autonomous vehicle, including objects to the side of the autonomous vehicle (e.g., adjacent lanes on a road), and/or behind the autonomous vehicle, for example.

In some examples, in addition to the first object, other objects may be identified by the computing device between the autonomous vehicle and the second object, such as multiple vehicles travelling in front of the autonomous vehicle and behind the second object. The objects may be within a longitudinal distance threshold from the autonomous vehicle and/or within a lateral distance threshold from the autonomous vehicle. For example, on a road of travel, the autonomous vehicle may adjust its speed based on the behavior of other vehicles or objects in front of the autonomous vehicle that are in the same lane as the vehicle. Further, the autonomous vehicle may adjust its speed based on the behavior of vehicles or other objects in adjacent lanes on the road of travel, such as an adjustment made when a nearby vehicle moves from its current lane to the lane in which the autonomous vehicle is travelling. In some scenarios, while it may be desirable for the autonomous vehicle to adjust its speed based on a vehicle travelling in the same lane at a given longitudinal distance in front of the autonomous vehicle or behind the autonomous vehicle, it may not be desirable for the autonomous vehicle to adjust its speed based on the behavior of objects at that same given distance laterally from the autonomous vehicle (e.g., objects in lanes that are beyond the adjacent lanes).

In some examples, the second object ahead of the first object, as well as other objects between the autonomous vehicle and the second object, may include another vehicle (e.g., cars, bicycles, etc.). In other examples, the second object may include a traffic control object, such as a stop sign, traffic light, traffic cone, road surface marking, road boundary barrier, and the like. In still other examples, the second object may be a pedestrian, such as a pedestrian crossing the street at an upcoming intersection. Other examples are also possible.

In addition to identifying the objects, the computing device may be configured to determine respective characteristics of each object. For example, the computing device may be configured to determine a type of an object or classify the object (e.g., car or truck, car or motorcycle, traffic sign or a pedestrian, etc.). Further, the computing device can determine whether the object is moving or stationary. In some examples, at least one object identified between the autonomous vehicle and the second object may be a dynamic (e.g., moving) object.

The computing device may be configured to estimate a size (e.g., width and length) and weight of the object. Further, the computing device may be configured to determine a direction of motion of the object, such as if the object is moving towards the autonomous vehicle or away from the vehicle. Still further, the computing device may be configured to determine a transmission type (e.g., manual and automatic) and transmission mode of the object, such as whether the object is in park, drive, reverse, or neutral transmission mode. Yet still further, the computing device may be configured to determine a position of the object in a respective lane on the road or path of travel, and how close the object may be to lane boundaries. In some examples, the computing device may be configured to determine relative longitudinal speed and lateral speed of the object with respect to the autonomous vehicle. These characteristics are examples for illustration, and other characteristics can be determined as well.

Characteristics of traffic control objects may also be determined, such as a color of a traffic light. In some examples, when a red traffic light is identified as an object substantially in front of the vehicle (e.g., the second object), the computing device may be configured to ignore objects beyond the traffic light (e.g., further away from the autonomous vehicle than the traffic light). The same configuration may apply in a scenario in which a stop sign is identified. In other examples, when a green traffic light is identified by the computing device, the computing device may be configured to ignore the green traffic light as an object and, as such, the speed of the autonomous vehicle may not be adjusted based on the presence of the green traffic light. In still other examples, when a yellow traffic light is identified by the computing device, the computing device may be configured to perform functions as if the traffic light was red or green, or may perform other functions. The computing device may also be configured to detect when a traffic light will change colors.

To identify the object and characteristics of the objects, the computing device may be configured to use the sensors and devices coupled to the autonomous vehicle. For example, a camera, such as the camera 134 in FIG. 1 or the camera 210 in FIG. 2 or any other image-capture device, may be coupled to the autonomous vehicle and may be in communication with the computing device. The camera may be configured to capture images or a video of the path/road of travel and vicinity of the path/road of travel. The computing device may be configured to receive the images or video and identify, using image processing techniques for example, objects depicted in the image or the video. The computing device may be configured compare portions of the images to templates of objects to identify the objects, for example.

In another example, the computing device may be configured to receive, from a LIDAR device (e.g., the LIDAR unit 132 in FIG. 1) coupled to the autonomous vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the autonomous vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the autonomous vehicle. Additionally, the LIDAR device may be configured to provide to the computing device intensity values of the light or laser reflected off the obstacles that may be indicative of a surface type of a given object. Based on such information, the computing device may be configured to identify the objects and characteristics of the objects such as type of the object, size, speed, whether the object is a traffic sign with a retroreflective surface, etc.

In still another example, the computing device may be configured to receive, from a RADAR device (e.g., the RADAR unit 130 in FIG. 1) coupled to the autonomous vehicle and in communication with the computing device, RADAR-based information relating to location and characteristics of the objects. The RADAR device may be configured to emit radio waves and receive back the emitted radio waves that bounced off the surface of objects on the road and in the vicinity of the road. The received signals or RADAR-based information may be indicative, for example, of dimensional characteristics of a given object, and may indicate whether the given object is stationary or moving.

In yet still another example, the computing device may be configured to have access to map information that identifies static objects that are permanently placed on the road such as traffic lights, traffic signs, guard rails, etc. The map information may also be updated periodically, and may include information about accidents that have recently occurred and the resulting wreckage or traffic that may be in the vicinity of the autonomous vehicle.

In one example, the computing device may be configured to detect and identify the objects and characteristics of the objects based on information received from multiple sources such as the image-capture device, the LIDAR device, the RADAR device, etc. However, in another example, the computing device may be configured to identify the objects based on information received from a subset of the multiple sources. For example, images captured by the image-capture device may be blurred due to a malfunction of the image-capture device, and in another example, details of the road may be obscured in the images because of fog. In these examples, the computing device may be configured to identify the objects based on information received from the LIDAR and/or RADAR units and may be configured to disregard the information received from the image-capture device.

In another example, the autonomous vehicle may be travelling in a portion of the road where some electric noise or jamming signals may cause the LIDAR device and/or RADAR device to operate incorrectly. In this case, the computing device may be configured to identify the objects based on information received from the image-capture device, and may be configured to disregard the information received from the LIDAR and/or RADAR units.

In one example, the computing device may be configured to rank these sources of information based on a condition of the road (e.g., fog, electronic jamming, etc.). The ranking may be indicative of which device(s) to rely on or give more weight to in identifying the objects. As an example, if fog is present in a portion of the road, then the LIDAR and RADAR devices may be ranked higher than the image-based device, and information received from the LIDAR and/or RADAR devices may be given more weight than respective information received from the image-capture device.

The computing device may also be configured to receive, from sensors and devices coupled to the autonomous vehicle, information associated with, for example, condition of systems and subsystems of the autonomous vehicle. Further, the computing device may be configured to receive information associated with the surrounding environment of the autonomous vehicle, such as driving conditions and road conditions (e.g., rain, snow, etc.). For example, information indicating that the road is icy or wet ahead of the vehicle may cause the computing device to modify its adjustment of the autonomous vehicle's speed. Other examples are also possible.

At block 306, the method 300 includes determining a first buffer distance, the first buffer distance being a minimal distance behind the first object at which the autonomous vehicle will substantially reach a speed of the first object. Further, at block 308, the method includes determining a second buffer distance, the second buffer distance being a minimal distance behind the second object at which the first object will substantially reach a speed of the second object. Still further, at block 310, the method includes determining a distance at which to adjust a speed of the autonomous vehicle based on the first and second buffer distances and the speed of the autonomous vehicle. It should be understood that other buffer distances may be determined as well when other objects are identified within an environment of the autonomous vehicle in addition to the first and second objects.

Figure 4A:
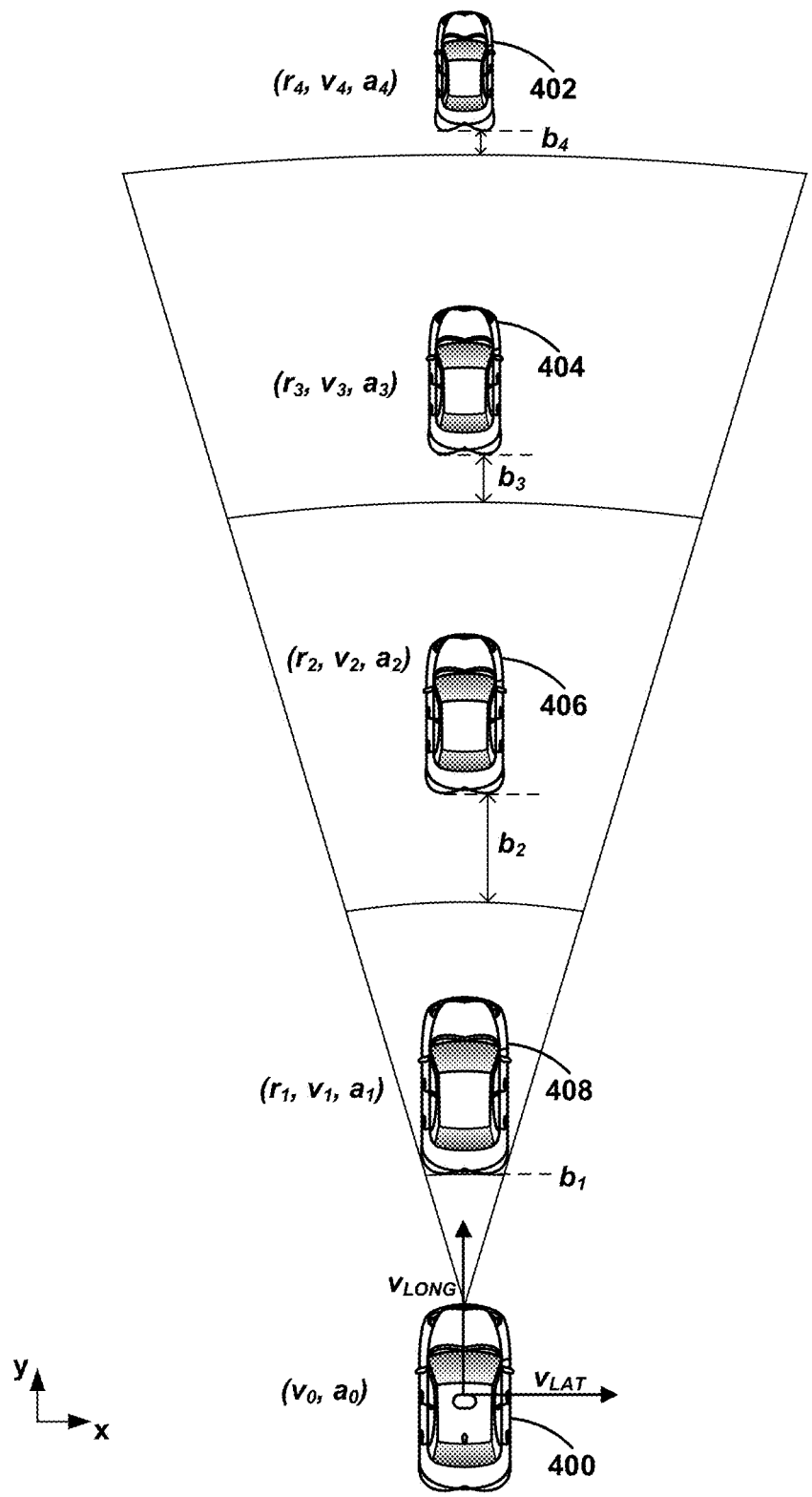
FIG. 4A illustrates an example for determining a distance at which to adjust the speed of the autonomous vehicle.

FIG. 4A illustrates an example scenario for determining the buffer distances and the distance at which to adjust the speed of the vehicle. As shown, an autonomous vehicle 400

(e.g., a computing device of the autonomous vehicle) travelling in the +y-direction may identify a plurality of objects 402-408 substantially in front of the autonomous vehicle 400 and also travelling in the +y-direction. The plurality of objects 402-408 may include an object travelling ahead of the autonomous vehicle 400, such as vehicle 402, and multiple objects between the autonomous vehicle 400 and vehicle 402, such as vehicle 404, vehicle 406, and vehicle 408. As shown, each vehicle may have respective characteristics that can be used to determine the distance, such as a range from the vehicle to the autonomous vehicle 400, $r_i$, a speed/velocity of the car, $v_i$, and an acceleration (or deceleration) of the car, $a_i$.

The autonomous vehicle 400 may also have characteristics that can be used to determine the distance, such as a speed/velocity of the autonomous vehicle 400, $r_0$, and an acceleration/deceleration of the autonomous vehicle 400, $a_0$. Further, the distance may be based on a longitudinal speed of the autonomous vehicle, $v_{LONG}$, and a lateral speed of the autonomous vehicle, $v_{LAT}$. In some examples, in addition to the distance being based on the speed of the autonomous vehicle (e.g., the current speed of the autonomous vehicle), the distance may be further based on other characteristics of the vehicle, including the autonomous vehicle's direction of motion, size, position on a path of travel, and type, among other characteristics.

In some examples, the autonomous vehicle 400 may also determine a buffer distance for each of the vehicles 402-408 and may use each buffer distance to predict the behavior of the vehicles 402-408 and determine a distance behind the vehicles that the autonomous vehicle 400 should adjust its speed. Each buffer distance may represent a minimal distance behind a given vehicle at which another vehicle directly following the given vehicle will match (or substantially reach) the speed of the given vehicle. By determining the buffer distances, the autonomous vehicle 400 can determine when (or at what distance from the nearest or furthest object) it will need to adjust its speed. For instance, the autonomous vehicle 400 may determine that vehicle 404 will match the speed of vehicle 402 at buffer distance $b_4$, that vehicle 406 will match the speed of vehicle 404 at buffer distance $b_3$, and that vehicle 408 will match the speed of vehicle 406 at buffer distance $b_2$. Note that buffer distance $b_1$ is approximately zero since vehicle 408 is closest in proximity to the autonomous vehicle 400 and thus the autonomous vehicle 400 can be assumed to be matching the speed of vehicle 408. Further, if vehicle 402 begins to slow down, the autonomous vehicle 400 may determine the buffer distances and thus determine that for each vehicle between the autonomous vehicle 400 and vehicle 402, the autonomous vehicle 400 will need to slow down earlier (at a certain distance from vehicle 402). The autonomous vehicle 400 may then begin to slow down before vehicles 404-408 react to the speed change of vehicle 402 and begin to slow down as well.

The buffer distance may be a function of the range from the vehicle to the given vehicle, and may be shorter when the vehicle is further away from the autonomous vehicle 400. For example, the buffer distance of vehicle 402, $b_4$, may be shorter than the other buffer distances because vehicle 402 is the furthest away from the autonomous vehicle 400 and thus its future behavior does not affect the autonomous vehicle 400 as much as the behaviors of the vehicles closer to the vehicle 400. In some examples, the buffer distance may be determined by multiplying a given time constant by the speed of the vehicle 400. Other examples of determining buffer distances are also possible.

Figure 4B:
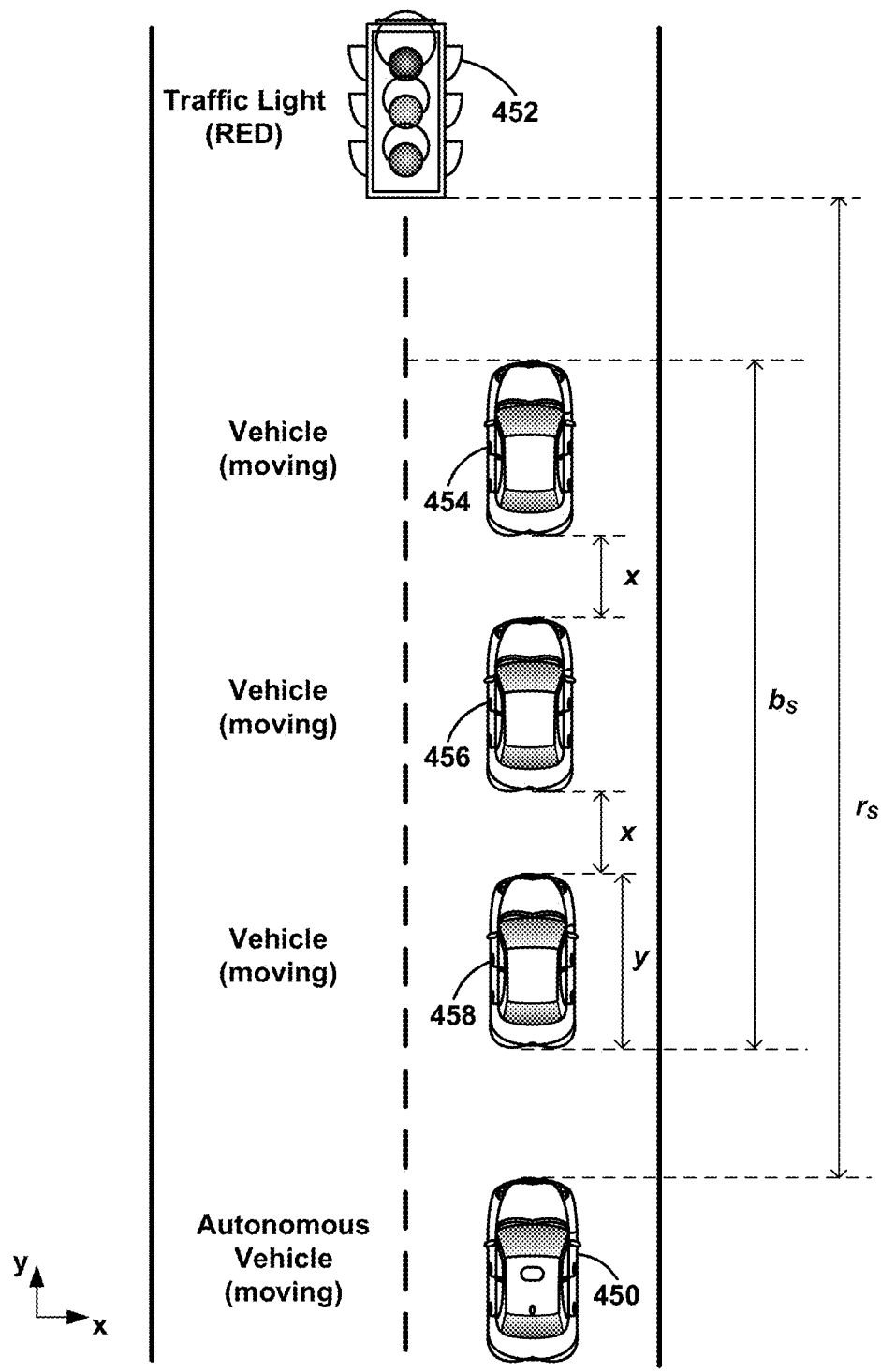
FIG. 4B illustrates an example for determining a distance at which to adjust the speed of the autonomous vehicle when a traffic control object is present.

FIG. 4B another example scenario for determining the distance at which to adjust the speed of the vehicle. As shown, an autonomous vehicle 450 similar to the autonomous vehicle 400 of FIG. 4A that is travelling in the +y-direction may identify a plurality of objects 452-458 substantially in front of the autonomous vehicle 450. The autonomous vehicle 450 may identify a red traffic light 452 (e.g., the second object) at a range of $r_S$ from the vehicle 450. Further, the autonomous vehicle 450 may identify vehicle 454, vehicle 456, and vehicle 458, each travelling in the +y-direction, and determine characteristics of each vehicle, such as respective speed (longitudinal and lateral), acceleration, range from the autonomous vehicle 450, and others.

Upon the autonomous vehicle 450 identifying the red traffic light 452 and the moving vehicles 454-458 between the autonomous vehicle 450 and the red traffic light 452, the autonomous vehicle 450 may be configured to determine a distance at which to adjust its speed. Further, the autonomous vehicle 450 may determine the distance before the vehicles 454-458 begin to slow down and stop due to the upcoming red traffic light ahead. In other words, the autonomous vehicle 450 may predict that the vehicles 454-458 will need to begin slowing down and stop before the red traffic light 452 and thus adjust its speed before the vehicles 454-458 come to a stop or begin to decelerate. In some scenarios, the red traffic light 452 may instead be a stopped vehicle or other object that is not moving, and would be identified and treated the same way by the autonomous vehicle 450 in such scenarios (e.g., as an object travelling at zero speed).

In some examples where vehicles 454-458 are not present and no objects are between the autonomous vehicle 450 and the red traffic light 452, the autonomous vehicle 450 may determine that it needs to come to a stop over the distance $r_S$. However, in examples such as the one illustrated in FIG. 4B, the autonomous vehicle 450 may determine that it has a shorter distance to come to a stop since vehicles 454-458 are in front of it. As such, the autonomous vehicle 450 may determine the distance at which to adjust its speed based on the range, $r_S$, and a buffer distance, $b_S$.

In addition to or alternatively to the factors affecting buffer distance as noted above, the buffer distance may be based on a length of a given object or objects and a predetermined minimal gap between each object at zero speed. For instance, as shown, each vehicle may have a length, y. The length of the objects may be different in other examples. Further, the predetermined (e.g., estimated) minimal gap between each vehicle when stopped may be a gap, x. As such, the autonomous vehicle 450 may determine $b_S$ by adding the lengths of the vehicles to the predetermined gaps (e.g., $b_S$=y+y+y+x+x=3y+2x). Therefore, the distance at which the vehicle 450 should adjust its speed may equal the range to the red traffic light 452, $r_S$, reduced by the buffer distance, $b_S$ (e.g., $r_S$, −$b_S$).

In general, when a traffic light is identified, the autonomous vehicle (e.g., the computing device of the vehicle) may determine the distance at which to adjust its speed based on the current state of the traffic light. In some examples, however, the autonomous vehicle may be configured to predict a change in a state of the traffic light. For instance, the autonomous vehicle may determine that, while the traffic light is currently red, the traffic light may change to green after a given period of time. Depending on the given period of time, the autonomous vehicle may consider the traffic light as a green traffic light and predict that the vehicles between the autonomous vehicle and the traffic light will begin to increase their speed. The autonomous vehicle may then speed up, slow down, or maintain speed, depending on its current speed.

As an example, the autonomous vehicle may be approaching a red traffic light, but may be a far enough distance away from the traffic light and stopped vehicles in front of the traffic light that it has not yet begun to slow down. The autonomous vehicle may determine that the traffic light will change from red to green after a short period of time and thus determine that the vehicles will begin to accelerate soon. Since the autonomous vehicle may still be a far distance from the traffic light and the vehicles, the autonomous vehicle may maintain its current speed (or increase its speed) if it determines that the vehicles will have sped up enough by the time the autonomous vehicle gets closer to them so that the autonomous vehicle's current speed (or increased speed) may substantially match the speed of the previously-stopped vehicle closest to the autonomous vehicle that the autonomous vehicle is approaching (e.g., vehicle 458 in FIG. 4B). Other examples are also possible.

It should be understood that the reasoning applied in the example described with respect to FIG. 4B can also apply to examples where the plurality of identified objects are moving (e.g., no traffic control devices), such as the example described with respect to FIG. 4A. It should also be understood that the distances/ranges between the autonomous vehicle 450, the red traffic light 452, and the vehicles 454-458 as illustrated in FIG. 4B may not be to scale. Specifically, it is likely that the distance between vehicle 454 and the red traffic light 452 would be much greater than the minimal gap distance between vehicles, x.

Referring back to FIG. 3, at block 312, the method 300 includes providing instructions to adjust the speed of the autonomous vehicle based on the distance. In some examples where multiple dynamic objects are between the autonomous vehicle and the second object, the computing device may adjust the speed of the autonomous vehicle prior to determining a change of the speed of one or more of the dynamic objects.

The control system of the autonomous vehicle may comprise multiple control strategies that may be predetermined or adaptive to changes in a driving environment of the autonomous vehicle, the driving environment including the predicted actions of objects substantially in front of the autonomous vehicle, behind the autonomous vehicle, and/or to the side of the autonomous vehicle. Generally, a control strategy may comprise sets of instructions or rules associated with traffic interaction in various driving contexts. The control strategy, for example, may comprise rules that determine a speed of the autonomous vehicle, steering angle, and a lane that the autonomous vehicle may travel on while taking into account safety and traffic rules and concerns (e.g., other vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, the computing device may be configured to determine, based on the distance determined at block 310, a control strategy comprising rules for actions that control speed, steering angle, and lane of the autonomous vehicle. The control strategy may also be further based on a lateral distance between the autonomous vehicle and nearby objects (e.g., road boundaries and vehicles travelling in adjacent lanes). Further, a given control strategy (or multiple strategies) may comprise a program or computer instructions that characterize actuators controlling the autonomous vehicle (e.g., throttle, steering gear, brake, accelerator, or transmission shifter).

In some examples, the instructions provided by the computing device to adjust the control of the autonomous vehicle (e.g., speed, steering, etc.) may be based on road geometry, such as if the road is straight, curving slightly, curving sharply, etc.

Figure 5:
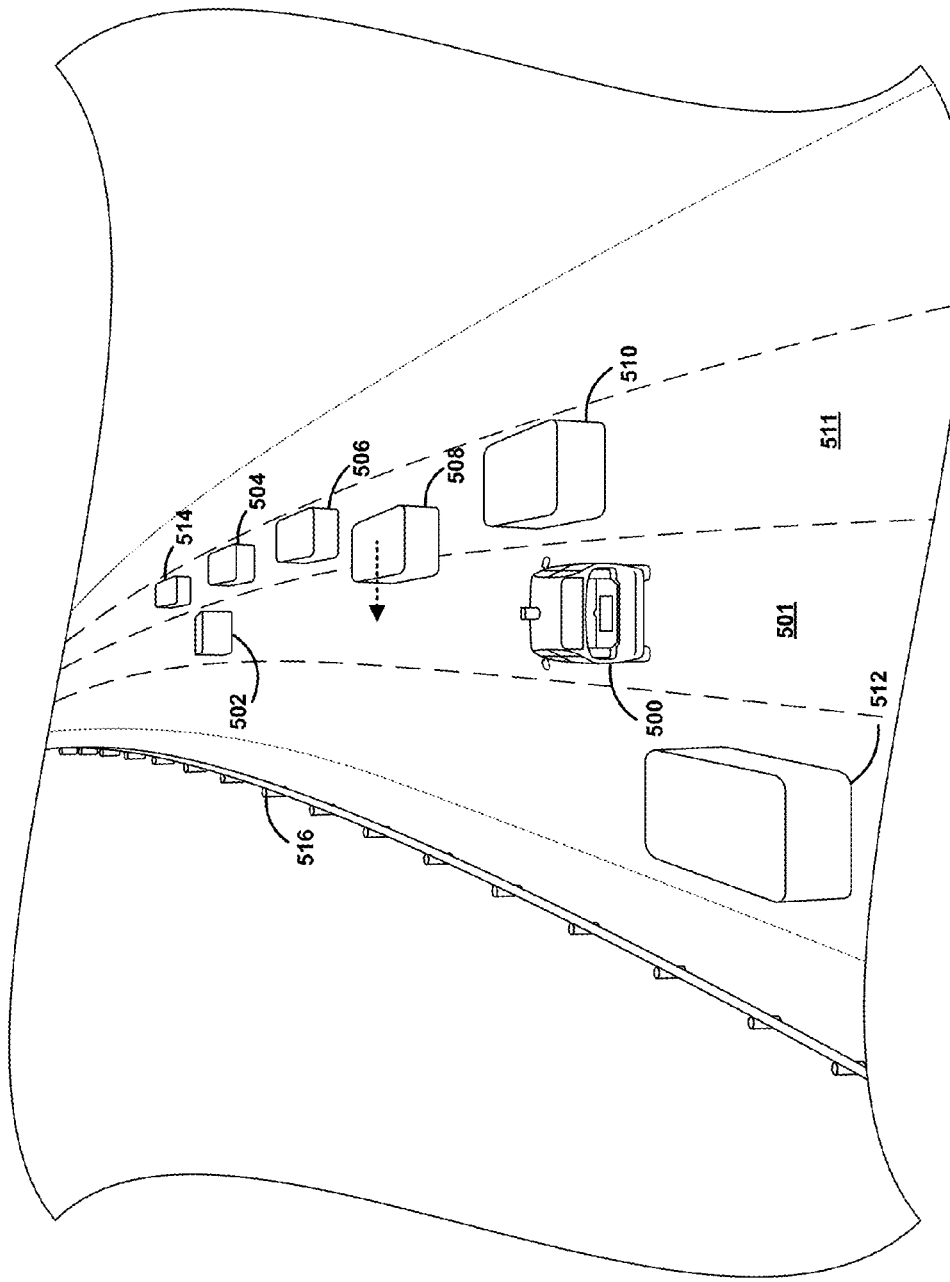
FIG. 5 illustrates an implementation of the example method on a road of travel.

FIG. 5 illustrates an implementation of the example method on a road of travel. The vehicle 500 may be in a lane 501 on a road such as a highway. The computing device configured to control the autonomous vehicle 500 may be configured to identify a plurality of objects substantially in front of the autonomous vehicle 500 on the road of travel. The plurality of objects may include an object 502, such as a moving object (e.g., cars, trucks, etc.), that is in the same lane 501 as the autonomous vehicle 500. The plurality of objects may also include moving objects 504, 506, 508, and 510 that are in an adjacent lane 511 to the lane 501 of the autonomous vehicle 500. In some examples, the computing device may not be configured to identify object 510 until the entirety of the length of the object 510 is in front of the autonomous vehicle 500.

In some examples, the computing device may be configured to identify other objects within the environment of the autonomous vehicle 500, such as object 512 located behind the autonomous vehicle 500 in an adjacent lane. In other examples, the computing device may be configured to ignore objects, such as object 514, that may be beyond a threshold distance from the autonomous vehicle 500. The computing device may also identify static objects such as a guard rail 516. The computing device further may be configured to determine characteristics of the objects 502-516, such as size, location, speed, etc.

In some examples, the autonomous vehicle 500 may be configured to only identify objects substantially in front of it, and may thus ignore objects 512 and 514. In other examples, the computing device may be configured to identify objects 512 and 514, but may ignore them until they are within a threshold distance from the autonomous vehicle 500. In such examples, the computing device may monitor characteristics of objects 512 and 514 so as to predict their future behavior while not yet taking their characteristics into account in determining the distance at which to adjust the speed of the autonomous vehicle 500 until the objects are within the threshold distance from the autonomous vehicle 500. For instance, the autonomous vehicle 500 may predict that object 512 will accelerate, exceed the speed of the autonomous vehicle 500, and pass the autonomous vehicle 500. The autonomous vehicle 500 may predict other actions of the object 512 as well (e.g., object 512 may pass the autonomous vehicle and move into the same lane as the autonomous vehicle).

The computing device may determine the distance at which to adjust the speed of the autonomous vehicle 500 based on identified objects 502-516, their characteristics, and respective buffer distances. In some examples, however, the computing device may determine that one or more objects substantially in front of the autonomous vehicle 500, such as object 508, may change lanes or are in the process of changing lanes. As such, the computing device may modify the distance to account for this (e.g., adjust the buffer distances). For instance, if object 508 changes lanes from lane 511 to lane 501, object 508 may be closer in proximity to the autonomous vehicle 500 and thus the autonomous vehicle 500 may need to adjust its speed in order to match the speed of object 508. Prior to detecting that object 508 is changing lanes, the autonomous vehicle 500 may have been travelling at a higher speed since no objects were identified to be in the same lane 501 as the autonomous vehicle 500 and object 502, and after detecting that object 508 has changed lanes, the autonomous vehicle 500 may reduce its speed. Further, the computing device may predict that object 510 will speed up to match the speed of object 506 once object 508 has fully or partially entered lane 501. The computing device may be configured to make other determinations/predictions as well, and modify the distance accordingly.

In some examples, the computing device may be configured to prioritize amongst the identified objects 502-516 in order to determine the distance. For instance, if object 508 is in the same lane 501 as the autonomous vehicle 500 and object 502, the behavior of object 508 may be taken more into account than the behaviors of objects 504, 506, and 510, which are in the adjacent lane 511. Such prioritization may take the form of modified buffer distances, for example (e.g., the buffer distance of object 510 may be shorter than the buffer distance of object 508, despite object 510 being closer in proximity to the autonomous vehicle 500). Thus, the computing device may be configured to add or subtract a buffer amount of distance to the determined distance to account for or compensate for such lane changes, as well as for any other changes in the environment of the autonomous vehicle 500. The prioritization may be implemented in other ways as well.

In some examples, the method described above may only be implemented by the computing device when there is at least one moving object between the autonomous vehicle and the second object, in addition to the identified first object. In examples where there are no moving objects between the autonomous vehicle and the second object, the method described above may not be implemented, or may be implemented in accordance with another method or methods not described herein.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors (e.g., processor 113 in the computing device 111) may provide functionality or portions of the functionality described above with respect to FIGS. 1-5. Thus, for example, referring to the embodiments shown in FIG. 3, one or more features of blocks 302-306 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device described with respect to FIGS. 1-5 may be configured to provide various operations, functions, or actions in response to the programming instructions 602 conveyed to the computing device by one or more of the computer readable medium 603, the computer recordable medium 604, and/or the communications medium 605. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    identifying a first vehicle travelling ahead of an autonomous vehicle;
    identifying a second vehicle ahead of the first vehicle, the first and second vehicles travelling in substantially a same lane as the autonomous vehicle;
    determining a first buffer distance, the first buffer distance being a minimal distance behind the first vehicle at which the autonomous vehicle is predicted to substantially reach a speed of the first vehicle;
    determining a second buffer distance, the second buffer distance being a minimal distance behind the second vehicle at which the first vehicle is predicted to substantially reach a speed of the second vehicle;
    determining a distance at which to adjust a speed of the autonomous vehicle based on the first and second buffer distances and the speed of the autonomous vehicle; and
    providing instructions by a computing device to adjust the speed of the autonomous vehicle based on the distance.

2. The method of claim 1, wherein providing the instructions by the computing device to adjust the speed of the autonomous vehicle comprises providing the instructions to adjust the speed of the autonomous vehicle prior to determining a change of the speed of at least one of the first and second vehicles.

3. The method of claim 1, further comprising:
    receiving, from an image-capture device coupled to the autonomous vehicle, an image; and
    wherein identifying the first and second vehicles comprises identifying at least one of the first and second vehicles in the image.

4. The method of claim 1, wherein the first and second vehicles are within a longitudinal distance threshold from the autonomous vehicle and within a lateral distance threshold from the autonomous vehicle.

5. The method of claim 1, wherein the speed of the first and second vehicles includes one or more of a longitudinal speed of the first and second vehicles and a lateral speed of the first and second vehicles, and wherein the distance at which to adjust the speed of the autonomous vehicle is further based on characteristics of the first and second vehicles, the characteristics including one or more of: an acceleration of a vehicle of the first and second vehicles, a deceleration of the vehicle, whether the vehicle is moving or stationary, a direction of motion of the vehicle, a size of the vehicle, a weight of the vehicle, a position of the vehicle on a road of travel, and a type of the vehicle.

6. The method of claim 1, wherein the distance at which to adjust the speed of the autonomous vehicle is further based on characteristics of the autonomous vehicle, the characteristics including one or more of: an acceleration of the autonomous vehicle, a deceleration of the autonomous vehicle, a direction of motion of the autonomous vehicle, a size of the autonomous vehicle, a position of the autonomous vehicle on a road of travel, and a type of the autonomous vehicle.

7. The method of claim 1, further comprising:
identifying an object ahead of the second vehicle, wherein the object includes another vehicle or a traffic control object; and
determining a third buffer distance, the third buffer distance being a minimal distance behind the object at which the second vehicle is predicted to substantially reach a speed of the object,
wherein the distance at which to adjust the speed of the autonomous vehicle is further based on the third buffer distance.

8. A non-transitory computer readable medium having stored thereon instructions that, upon execution by a computing device, cause the computing device to perform functions comprising:
identifying a first vehicle travelling ahead of an autonomous vehicle;
identifying a second vehicle ahead of the first vehicle, the first and second vehicles travelling in substantially a same lane as the autonomous vehicle;
determining a first buffer distance, the first buffer distance being a minimal distance behind the first vehicle at which the autonomous vehicle is predicted to substantially reach a speed of the first vehicle;
determining a second buffer distance, the second buffer distance being a minimal distance behind the second vehicle at which the first vehicle is predicted to substantially reach a speed of the second vehicle;
determining a distance at which to adjust a speed of the autonomous vehicle based on the first and second buffer distances and the speed of the autonomous vehicle; and
providing instructions to adjust the speed of the autonomous vehicle based on the distance.

9. The non-transitory computer readable medium of claim 8, wherein providing the instructions to adjust the speed of the autonomous vehicle comprises providing the instructions to adjust the speed of the autonomous vehicle prior to determining a change of the speed of at least one of the first and second vehicles.

10. The non-transitory computer readable medium of claim 8, wherein the first and second buffer distances are further based on lengths of the first and second vehicles and a predetermined minimal gap between the first and second vehicles at zero speed.

11. The non-transitory computer readable medium of claim 8, wherein the distance at which to adjust the speed of the autonomous vehicle is based in part on a time constant multiplied by the speed of the autonomous vehicle.

12. A system comprising:
at least one processor; and
a memory having stored thereon instructions that, upon execution by the at least one processor, cause the system to perform functions comprising:
identifying a first object ahead of an autonomous vehicle;
identifying a second object ahead of the first object, wherein the first and second objects are in substantially a same lane as the autonomous vehicle;
determining a first buffer distance, the first buffer distance being a minimal distance behind the first object at which the autonomous vehicle is predicted to substantially reach a speed of the first object;
determining a second buffer distance, the second buffer distance being a minimal distance behind the second object at which the first object is predicted to substantially reach a speed of the second object;
determining a distance at which to adjust a speed of the autonomous vehicle based on the first and second buffer distances and the speed of the autonomous vehicle; and
providing instructions to adjust the speed of the autonomous vehicle based on the distance.

13. The system of claim 12, wherein providing the instructions to adjust the speed of the autonomous vehicle comprises providing the instructions to adjust the speed of the autonomous vehicle prior to determining a change of the speed of at least one of the first and second objects.

14. The system of claim 13, wherein the change of the speed of at least one of the first and second objects includes an increase of the speed of the first object, and wherein the instructions to adjust the speed of the autonomous vehicle include instructions to increase the speed of the autonomous vehicle so as to substantially reach the increased speed of the first object.

15. The system of claim 13, wherein the change of the speed of at least one of the first and second objects includes a decrease of the speed of the first object, and wherein the instructions to adjust the speed of the autonomous vehicle include instructions to decrease the speed of the autonomous vehicle so as to substantially reach the decreased speed of the first object.

16. The system of claim 12, wherein the second object includes one or more of a stop sign, a traffic light, a traffic cone, a road surface marking, and a road boundary barrier.

17. The system of claim 12, wherein at least one of the first and second objects includes a vehicle travelling ahead of the autonomous vehicle.

18. The system of claim 12, wherein determining the distance at which to adjust the speed of the autonomous vehicle comprises reducing a distance from the autonomous vehicle to the second object by the first and second buffer distances.

19. The system of claim 12, wherein the distance at which to adjust the speed of the autonomous vehicle is further based on characteristics of the first and second objects, the characteristics including one or more of: a longitudinal speed of an object of the first and second objects, a lateral speed of the object, an acceleration of the object, a deceleration of the object, a direction of motion of the object, a size of the object, a weight of the object, a position of the object on a road of travel, and a type of the object.

20. The system of claim 19, further comprising:
a light detection and ranging (LIDAR) device coupled to the autonomous vehicle, wherein the LIDAR device is configured to provide LIDAR-based information comprising a three-dimensional (3D) point cloud that includes a set of points based on light emitted from the LIDAR device and reflected from the first and second objects;

a camera coupled to the autonomous vehicle, wherein the camera is configured to provide one or more images of the first and second objects; and a radio detection and ranging (RADAR) device coupled to the autonomous vehicle, wherein the RADAR device is configured to provide RADAR-based information relating to at least one of the characteristics of the first and second objects.

* * * * *